(12) United States Patent
Shtrauch et al.

(10) Patent No.: US 10,764,160 B1
(45) Date of Patent: Sep. 1, 2020

(54) SYSTEM, METHOD, AND COMPUTER PROGRAM FOR UTILIZING AN OPEN AND GLOBAL/PRIVATE BLOCKCHAIN SYSTEM FOR VIRTUAL NETWORK FUNCTION (VNF) CERTIFICATION AND CONSUMPTION PROCESSES

(71) Applicant: Amdocs Development Limited, Limassol (CY)

(72) Inventors: Eyal Binyamin Shtrauch, Geulim (IL);
Nagina Eliav, Even Yehuda (IL);
Hanoch Sapoznikov, Zidman (IL);
Vladimir Tkach, Kefar Yona (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 156 days.

(21) Appl. No.: 15/961,758

(22) Filed: Apr. 24, 2018

(51) Int. Cl.
| | |
|---|---|
| *H04L 29/08* | (2006.01) |
| *H04L 12/24* | (2006.01) |
| *G06F 21/64* | (2013.01) |
| *H04L 29/06* | (2006.01) |
| *H04L 9/06* | (2006.01) |
| *G06F 9/455* | (2018.01) |
| *G06Q 30/06* | (2012.01) |
| *G06F 16/27* | (2019.01) |

(52) U.S. Cl.
CPC ...... *H04L 41/5041* (2013.01); *G06F 9/45558* (2013.01); *G06F 16/27* (2019.01); *G06F 21/645* (2013.01); *G06Q 30/06* (2013.01); *H04L 9/0637* (2013.01); *H04L 63/0823* (2013.01); *G06F 2009/45595* (2013.01)

(58) Field of Classification Search
CPC ................................................ H04L 41/5041
See application file for complete search history.

(56) References Cited

U.S. PATENT DOCUMENTS

| | | | |
|---|---|---|---|
| 9,578,664 B1 | 2/2017 | Paczkowski et al. | |
| 10,310,760 B1 * | 6/2019 | Dreier ................... | G06F 3/0631 |

(Continued)

OTHER PUBLICATIONS

Maitland et al., U.S. Appl. No. 15/379,372, filed Dec. 14, 2016.

(Continued)

*Primary Examiner* — Adnan M Mirza
(74) *Attorney, Agent, or Firm* — Zilka-Kotab, P.C.

(57) ABSTRACT

A system, method, and computer program product are provided for utilizing an open and global/private blockchain system for supporting Virtual Network Function (VNF) certification and consumption processes. In operation, a system receives a request by one or more first entities to publish information to an open and global/private blockchain system for one or more VNF certification processes or VNF consumption processes. The system publishes the information to the blockchain system such that the information is stored to a ledger utilizing blockchain technology. Additionally, the system may send at least one notification to one or more second entities indicating that the information has been published to the blockchain system for accessing by the one or more second entities. In addition, the system exposes all relevant information from the open and global/private blockchain and enables $3^{rd}$ party entities to leverage this information and enhance the system functionality.

7 Claims, 18 Drawing Sheets

(56) References Cited

U.S. PATENT DOCUMENTS

| | | |
|---|---|---|
| 2015/0288541 A1 | 10/2015 | Fargano et al. |
| 2016/0226663 A1 | 8/2016 | Jones et al. |
| 2017/0054565 A1 | 2/2017 | Feng et al. |
| 2017/0123863 A1 | 5/2017 | Erickson et al. |
| 2018/0069798 A1* | 3/2018 | Bacik .................. H04L 41/0806 |

OTHER PUBLICATIONS

Hermoni et al., U.S. Appl. No. 62/509,637, filed May 22, 2017.
Hermoni et al., U.S. Appl. No. 62/509,623, filed May 22, 2017.
Schwartz et al., U.S. Appl. No. 15/222,844, filed Jul. 28, 2016.
Kojukhov et al., U.S. Appl. No. 15/672,068, filed Aug. 8, 2017.
Hermoni et al., U.S. Appl. No. 15/841,123, filed Dec. 13, 2017.
JSON, "Introducing JSON," Oct. 4, 2017, as retrieved by the Internet Archive Wayback Machine, pp. 1-8, https://web.archive.org/web/20171004185541/http://www.json.org/index.html.
Investorpedia, "Blockchain," Jan. 8, 2018, as retrieved by the Internet Archive Wayback Machine, pp. 1-7, https://web.archive.org/web/20180108065843/https://www.investopedia.com/terms/b/blockchain.asp.

* cited by examiner

| Key | Value | Description |
|---|---|---|
| contract_type | register_participant | The type of this contract |
| participant_type | CSP | Can be also VNF provider, Certifier, etc. |
| participant_id | 0f553769-a89b-41aa-bf86-7421358e2db1 | Autogenerated unique identification code for the participant |
| participant_public_key | -----BEGIN PUBLIC KEY-----<br>MIGeMA0GCSqGSIb3DQEBAQUAA4GMADCBiAKBgF9aN<br>HGtRVDMrPoOvtgrCafG+T+d<br>oQtEIU+cL2VKxvWWguQJcN+2BhMrBN9Gpxqrlu6RDIue<br>RhCmq84rFIwQLNeVCtvd<br>gS9wEZb90+/D5OIaFv1BkvFF02MXBFthIf0fqRDAqmqU/I<br>jhrirJzI6GdY3O89nH<br>iZw8P3Eyg5iCs4cpAgMBAAE=<br>-----END PUBLIC KEY----- | The public crypto-key of the participant |
| ... | | |

FIGURE 14A

| Key | Value | Description |
|---|---|---|
| contract_type | cfc_bid | The type of this contract |
| bidder_id | 0f553769-a89b-41aa-bf86-7421358e2db1 | A participant_id of the bidding CSP |
| cdm_profile | {<br><br>"csp" : ["Vodafone"],<br>"certificate_type" : ["Performance"],<br>"product": ["DPI", "DDoS", "FW"],<br>...<br>} | JSON element describing the CDM (Certificate Data Model) profile |
| ... | | |
| contract_signature | 9D9B5A9EEE8E4853C2AED3D309AB6573E7C9EB8C618<br>7AF5741201E9075102F36 | Hash signature of the contract data signed with the bidder's crypto-keys. Uses for validating the authenticity of the contract data |

FIGURE 14B

| Key | Value | Description |
| --- | --- | --- |
| contract_type | cfc_contract | The type of this contract |
| csp_id | 0f553769-a89b-41aa-bf86-7421358e2db1 | A participant_id of the CSP |
| certifier_id | 783c0177-13a2-4943-bff9-740c60b58e44 | A participant_id of the Certifier |
| cdm_profile | {<br>  "csp" : ["Vodafone"],<br>  "certificate_type" : ["Performance"],<br>  "product": ["DPI", "DDoS", "FW"],<br>  ...<br>} | JSON element describing the CDM (Certificate Data Model) profile |
| ... | | |
| csp_contract_signature | 5FEBA6879178B4D528A71634A45CB03A00F05DAEF3D83B80FD6B76857654CBA8 | Hash signature of the contract data signed with the CSP's crypto-keys |
| certifier_contract_signature | A0A22D4EAA7ADF879988B0945C8C473CE964EDE2B40F81048E7E875F9C44F1A7 | Hash signature of the contract data signed with the Certifier's crypto-keys |

FIGURE 14C

| Key | Value | Description |
| --- | --- | --- |
| contract_type | cfp_bid | The type of this contract |
| bidder_id | a74d7480-0fd7-4768-99e3-e045c858448d | A participant_id of the bidding VNF Provider |
| cdm_profile | {<br>  "csp" : ["Vodafone", "AT&T"],<br>  "certificate_type" : [<br>    "Performance",<br>    "ONAP"<br>  ],<br>  "product": ["DDoS", "FW"],<br>  "vnf_id" : "320dba40-b41d-4032-ab70-dceee789ec23"<br>  "vnf_description" : "...",<br>  "vnf_version" : "1.0.8"<br>  ...<br>} | JSON element describing the CDM (Certificate Data Model) profile with the requested VNF product information |
| ... | | |
| contract_signature | BC0CF940A82EB145A8F13ECF81A075AD59FEABAC61014904E9743576DA408571 | Hash signature of the contract data signed with the bidder's crypto-keys |

FIGURE 14D

| Key | Value | Description |
|---|---|---|
| contract_type | cfp_contract | The type of this contract |
| vnf_provider_id | a74d7480-0fd7-4768-99e3-e045c858448d | A participant_id of the VNF Provider |
| certifier_id | 783c0177-13a2-4943-bff9-740c60b58e44 | A participant_id of the Certifier |
| cdm_profile | {<br>  "csp" : ["Vodafone", "AT&T"],<br>  "certificate_type" : [<br>    "Performance",<br>    "ONAP"<br>  ],<br>  "product": ["DDoS", "FW"],<br>  "vnf_id" : "320dba40-b41d-4032-ab70-dceee789ec23"<br>  "vnf_description" : "...",<br>  "vnf_version" : "1.0.8"<br>  ...<br>} | JSON element describing the CDM (Certificate Data Model) profile with the requested VNF product information |
| ... | | |
| vnf_provider_contract_signature | CC536CF3BA015DBFB86238CE756AA093E6C8A68DCD295536AF96839794F755B8 | Hash signature of the contract data signed with the VNF Provider's crypto-keys |
| certifier_contract_signature | 962584731A5ECC640EACFC9D9F113AE59B9DF596CC219A46A4C4A202E370E1EE | Hash signature of the contract data signed with the Certifier's crypto-keys |

FIGURE 14E

| Key | Value | Description |
|---|---|---|
| contract_type | csp_vnf_contract | The type of this contract |
| csp_id | 0f553769-a89b-41aa-bf86-7421358e2db1 | A participant_id of the CSP |
| vnf_provider_id | a74d7480-0fd7-4768-99e3-e045c858448d | A participant_id of the VNF Provider |
| vnf_data | {<br>  "vnf_id" : "320dba40-b41d-4032-ab70-dceee789ec23"<br>  "vnf_description" : "...",<br>  "vnf_version" : "1.0.8"<br>  ...<br>} | JSON element describing the VNF product information |
| ... | | |
| csp_contract_signature | AB1B63E6F06AC008F12365D094ADF7EEAC98651535298C2B712A1EC8DD28505D | Hash signature of the contract data signed with the CSP's crypto-keys |
| vnf_provider_contract_signature | F96E3D5D258196F4691E95784384480DD56C6690B6CE6E25076477B329FE55869 | Hash signature of the contract data signed with the VNF Provider's crypto-keys |

FIGURE 14F

SYSTEM, METHOD, AND COMPUTER PROGRAM FOR UTILIZING AN OPEN AND GLOBAL/PRIVATE BLOCKCHAIN SYSTEM FOR VIRTUAL NETWORK FUNCTION (VNF) CERTIFICATION AND CONSUMPTION PROCESSES

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance. However, current techniques for VNF certification and consumption processes are limited.

There is thus a need for addressing these and/or other issues associated with the prior art.

SUMMARY

A system, method, and computer program product are provided for utilizing an open and global/private blockchain system for supporting Virtual Network Function (VNF) certification and consumption processes. In operation, a system receives a request by one or more first entities to publish information to an open and global/private blockchain system for one or more VNF certification processes or VNF consumption processes. The system publishes the information to the blockchain system such that the information is stored to a ledger utilizing blockchain technology. Additionally, the system may send at least one notification to one or more second entities indicating that the information has been published to the blockchain system for accessing by the one or more second entities. In addition, the system exposes all relevant information from the open and global/private blockchain and enables 3$^{rd}$ party entities to leverage this information and enhance the system functionality.

BRIEF DESCRIPTION OF THE DRAWINGS

FIGS. 14A-14F illustrate examples of blockchain contracts, in accordance with various embodiments.

DETAILED DESCRIPTION

Figure 1:
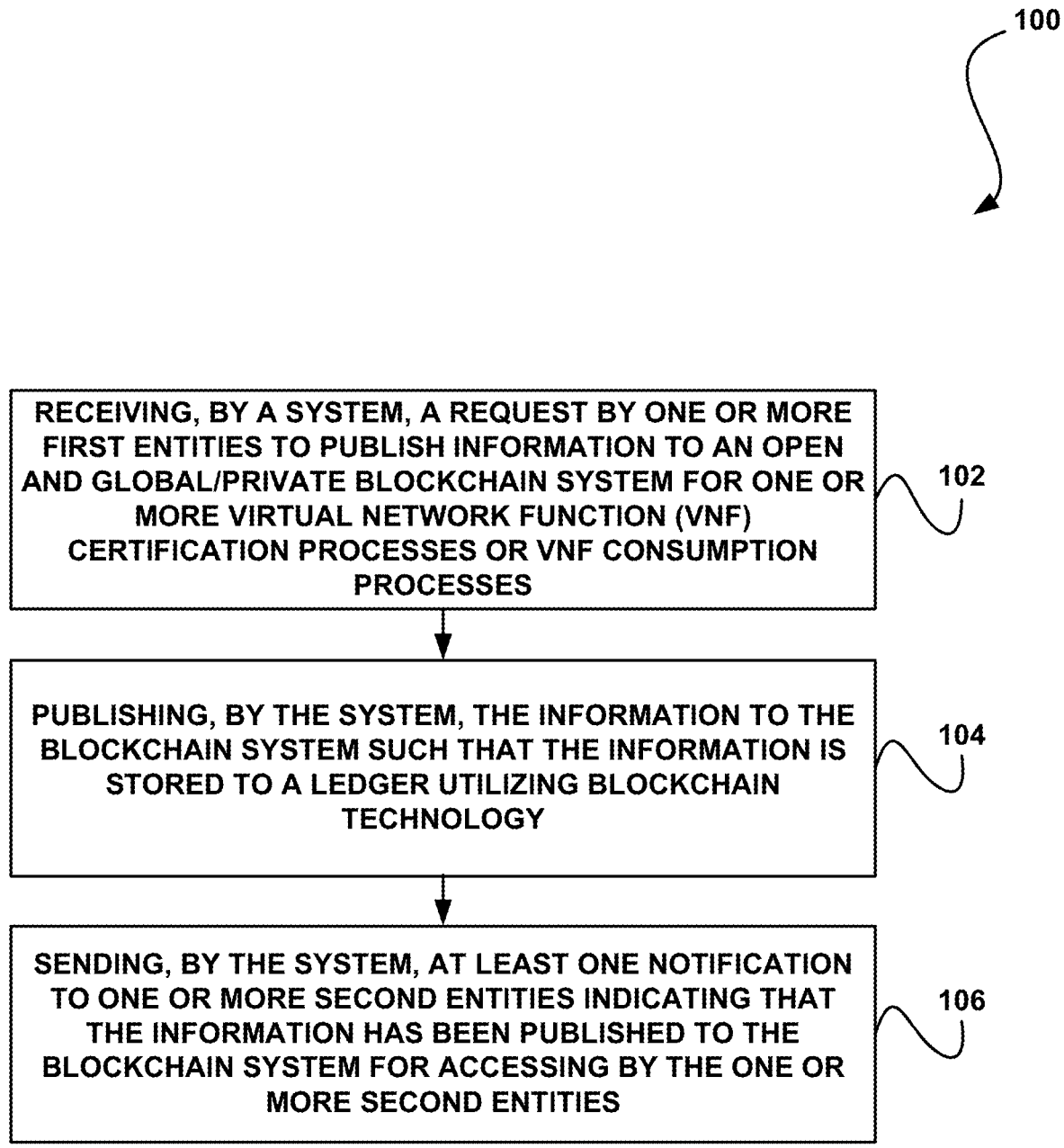
FIG. 1 illustrates a method for utilizing an open and global/private blockchain system for Virtual Network Function (VNF) certification and consumption processes, in accordance with one embodiment.

FIG. 1 illustrates a method 100 for utilizing an open and global/private blockchain system for Virtual Network Function (VNF) certification and consumption processes, in accordance with one embodiment.

In operation, a system receives a request by one or more first entities to publish information to an open and global or private blockchain system for one or more VNF certification processes and/or one or more VNF consumption processes. See operation 102. The information may be associated with any type of VNF certification process and/or VNF consumption process. For example, the information may include or be associated with bids, contracts, certifications, usage, and/or documentation, etc., embodied as a blockchain contract. In one embodiment, the blockchain may be a public global blockchain. In another embodiment, the blockchain may be private system.

The first entities may include any entity (e.g. company, person, etc.) associated with a VNF and/or an NFV network, such as one or more VNF vendors, VNF certifiers, and/or Communication Service Providers (CSPs), etc.

The blockchain system may be associated with the system implementing the method 100 (e.g. a subsystem, etc.) and/or another system. The blockchain system may include any functionality for implementing blockchain technology. As described herein, the blockchain system will be referred to interchangeably as the "blockchain eco-system", the "VNF eco-system", and the "eco-system". Blockchain refers to a digitized, decentralized, public ledger containing crypto transactions, constantly growing as "completed" blocks (representing transactions) are recorded and added to it in chronological order. The blockchain allows eco-system participants (e.g. publishers, subscribers, etc.) to keep track of digital transactions without central recordkeeping. Each node (a computer connected to the network) gets a copy of the blockchain, which is updated automatically. A publicly available API (Application Programming Interface) may be used to provide participants (e.g. developers, etc.) with programmatic access to the eco-system services. The blockchain system may include a distributed publish-subscribe mechanism that enables any member of the blockchain system to subscribe to any type of published events and receive notifications accordingly, as well as provide the participants with an interface to publish the events.

The system publishes the information to the blockchain system such that the information is stored to a ledger utilizing blockchain technology. See operation 104. In one embodiment, the information may be stored in the blockchain system as a combination of a profile that defines a data model of a certain use case for a specific Communication Service Provider, and additional data needed for describing the relevant use case. Such as, in one embodiment, the certifier entity, definition and limitation for the certification, etc.

Additionally, the system may send at least one notification to one or more second entities indicating that the information has been published to the blockchain system for accessing by the one or more second entities. See operation 106. The second entities may include any entity (e.g. company, person, etc.) associated with a VNF and/or an NFV network, such as one or more VNF vendors, VNF certifiers, and/or Communication Service Providers, etc., and may also be the same as the first entities. In one embodiment, the method 100 may further include publishing additional information (e.g. a response to the first information, etc.) from the one or more second entities to the blockchain system such that the additional information is stored to the ledger utilizing the blockchain technology. The additional information may be associated with any type of VNF certification process and/or VNF consumption process, such as information associated with bids, contracts, certifications, usage, and/or documentation, etc.

The blockchain system may be utilized to facilitate interactions between any number of entities for various transactions associated with VNF certification processes or VNF consumption processes. For example, in one embodiment, publishing the information to the blockchain system may include publishing a call from a Communication Service Provider for VNF certifiers to certify any profile (which can include a collection of VNFs). In another embodiment, publishing the information to the blockchain system may include publishing a bid associated with VNF certification to one or more certification profiles.

In the context of the present description, the terms "network" and "communication network" refer to the hardware and software connecting one or more communication elements including wireline networks, wireless networks, and/or combinations thereof.

The terms "network function virtualization" (NFV) and Virtual Network Function (VNF) are described in a series of documents published by the European Telecommunications Standards Institute (ETSI) and available from the ETSI website. The term "Virtual Network Function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for utilizing an open and global/private blockchain system for enabling Virtual Network Function certification and consumption processes, according to various embodiments may be further understood with reference to the following drawings and accompanying description.

Figure 2:
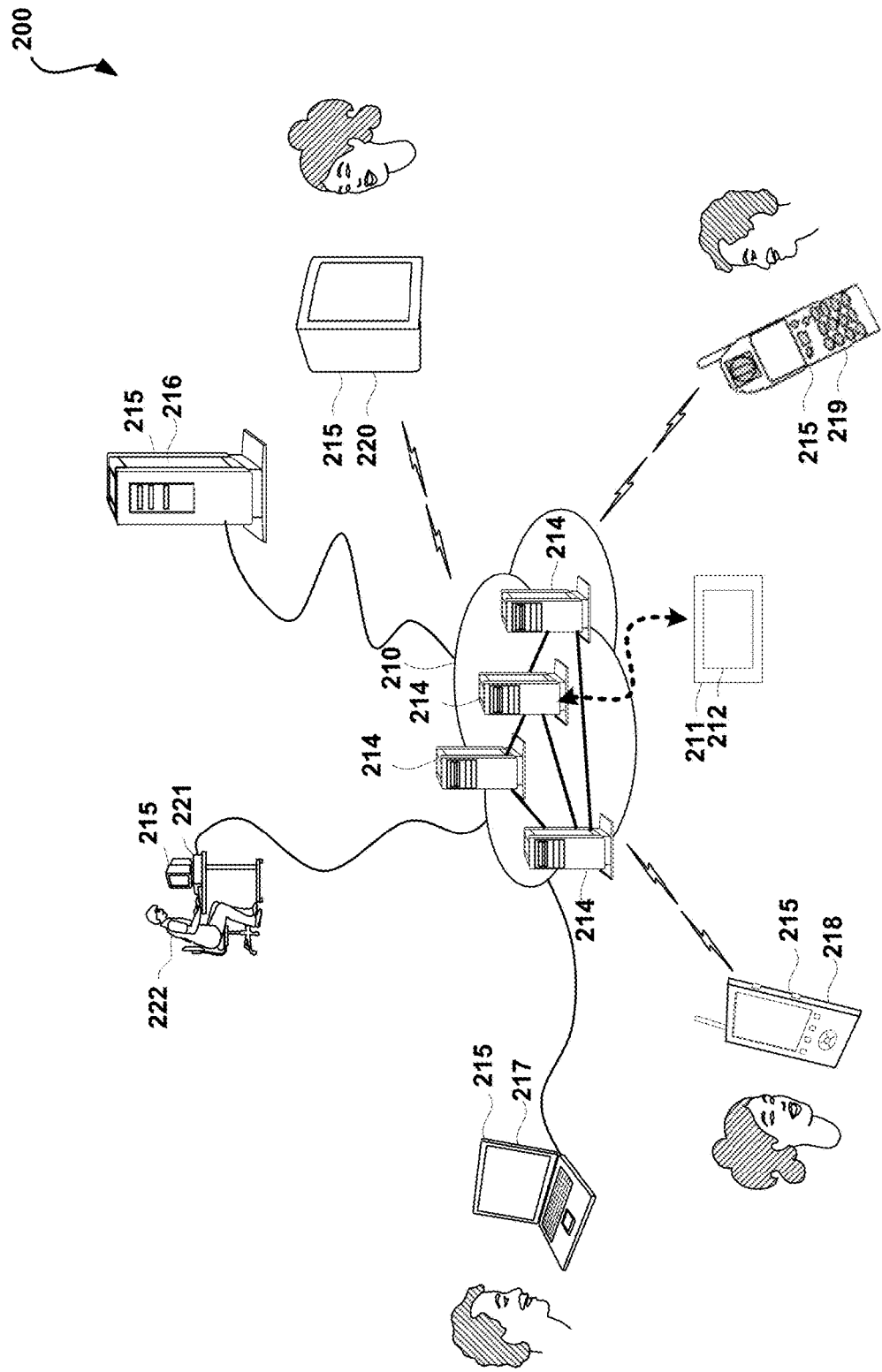
FIG. 2 illustrates a simplified diagram of a system associated with an NFV-based communication network, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

As shown in FIG. 2, at least one NFV-based network 210 is provided. The NFV-based communication network 210 includes an NFV management system 2111, and an NFV-orchestration (NFV-O) module 212, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.) etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211 and the NFV-O 212.

Figure 3:
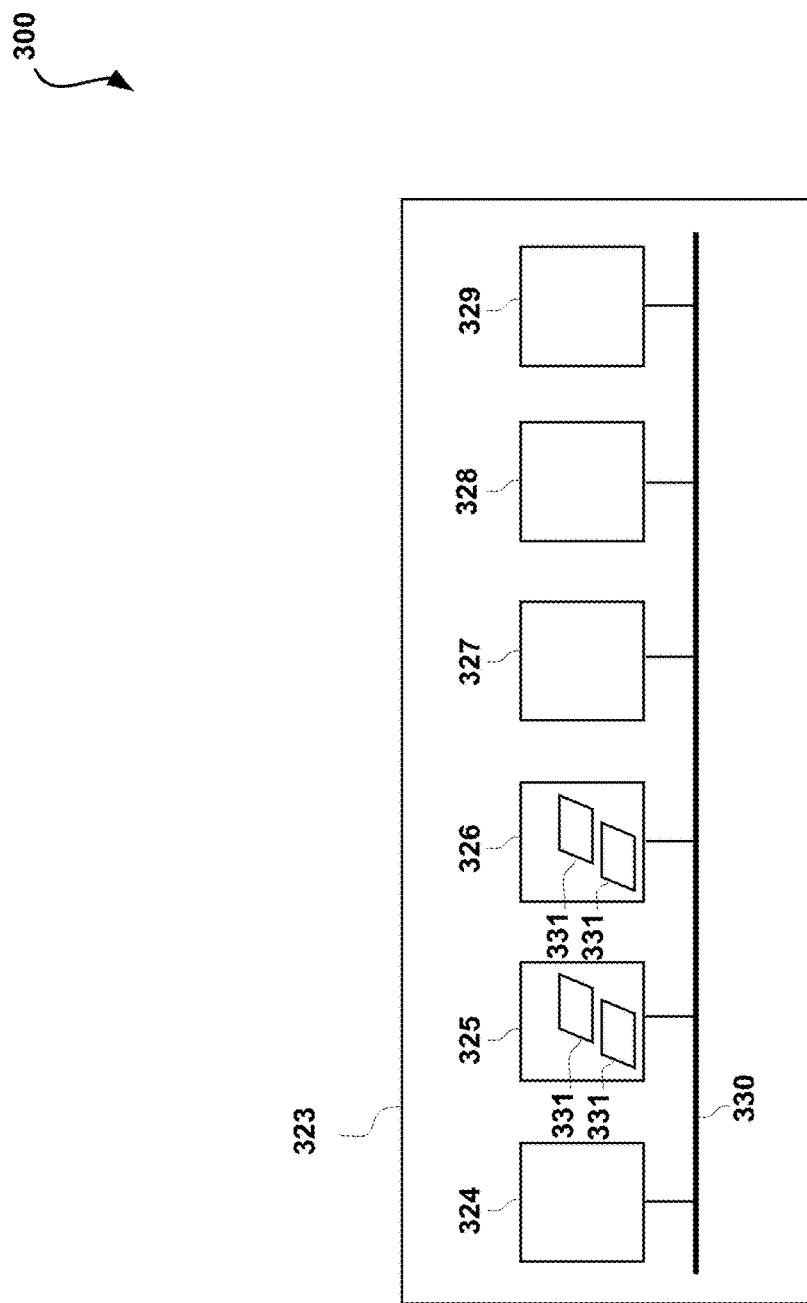
FIG. 3 illustrates a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process Virtual Network Functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211 and/or the NFV-O 212 of FIG. 2.

Figure 4:
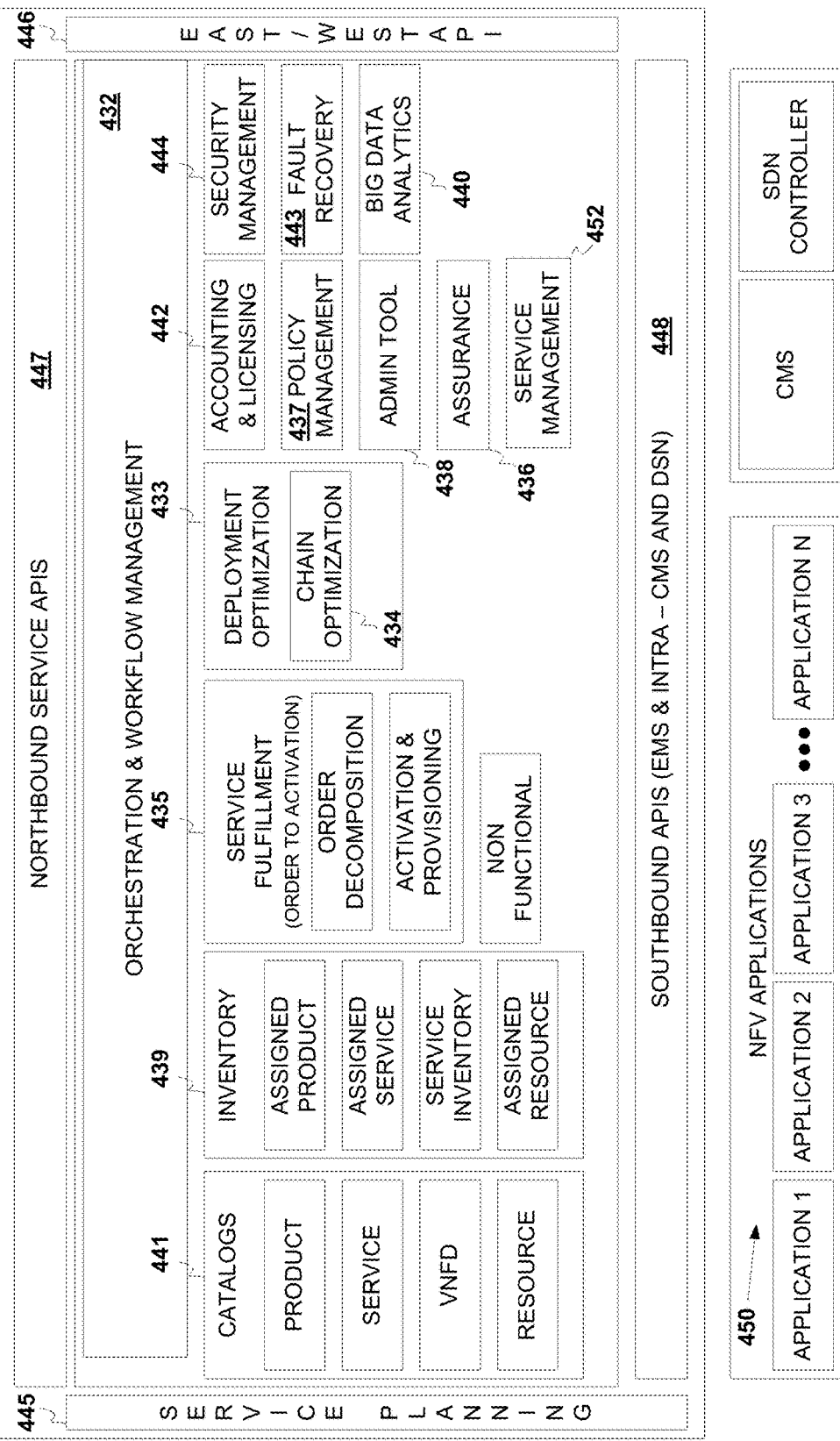
FIG. 4 illustrates a simplified diagram of an NFV management system, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/ truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a Communication Service Provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
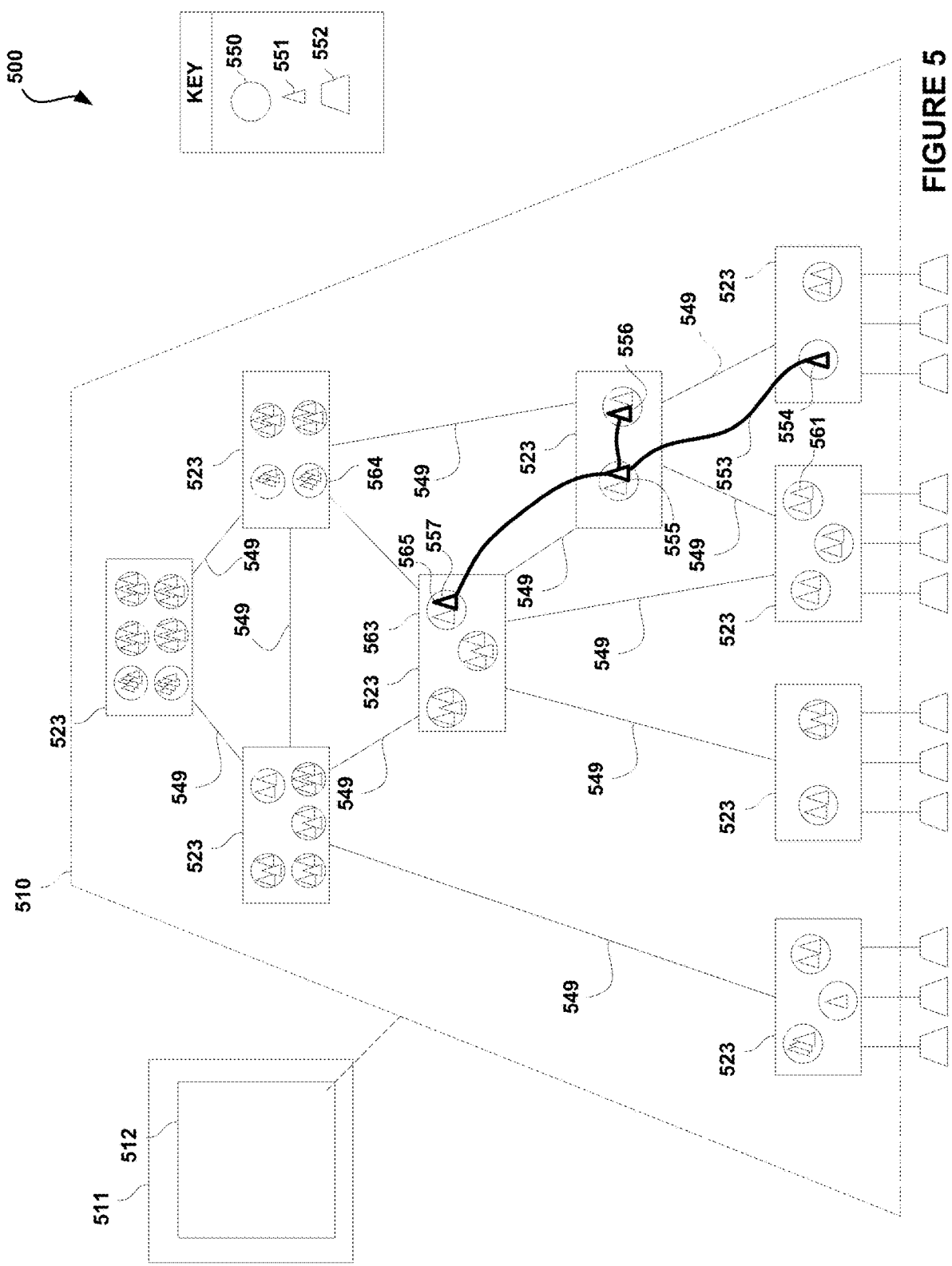
FIG. 5 illustrates a simplified diagram of a deployed NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511 and an NFV-orchestration (NFV-O) 512 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of Virtual Network Functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

To date, VNF certification and consumption processes enablement have not been handled in an open setting that allows all participants access to such processes and results. The blockchain system described herein allows for implementation of a VNF marketplace, open to all vendors, CSPs, certifiers and other relevant participants, by implementation of an open bidding and contracting platform for the VNF certification and consumption enablement processes. The bidding and contracting will be done based on an open and global/private blockchain (or any other relevant technology) eco-system (in one embodiment, the eco-system can be powered by the Linux foundation).

The eco-system will be shared, bringing together CSPs, NFV vendors, VNF certifiers (certification providers) and other relevant participants. This will enable the growth of a viable VNF eco-system, driving innovation and better prices for the CSPs. The eco-system will drive toward a true decentralized distribution of power.

The current VNF reality has many barriers preventing the evolution of a viable market, such as: lack of orchestrator standard; lack of trust (the CSPs do not have an effective mechanism for gaining trust of the VNF provider, which drives small players out of the market, keeping only the big and expensive players); long and costly lead time (the lack of trust and certification forces each CSP to invest a lot of time and money in the certification and integration process by itself or by using expensive third party integration services); high prices for VNFs due to the limited market and the small variety of VNFs; high process bureaucracy; and slow innovation cycle caused by the limited number of vendors in the market and the difficulty for a new vendor to enter the market.

The telecommunication networks are mission critical systems, and as such the CSPs tend to take extra caution in the transformation process. These barriers add more complexity and risks to this transformation. These barriers also slow down any innovation initiatives, and further delays the transformation. The network architecture is changing from using pre-integrated suites to using complex service-chains of granulated functionality (e.g. DPI—deep packet inspection, FWs, load balancers, etc.). This change emphasizes the importance of a sophisticated market that will enable and catalyze the formation of those functionality components (i.e. VNFs and the integration between them).

Figure 6:
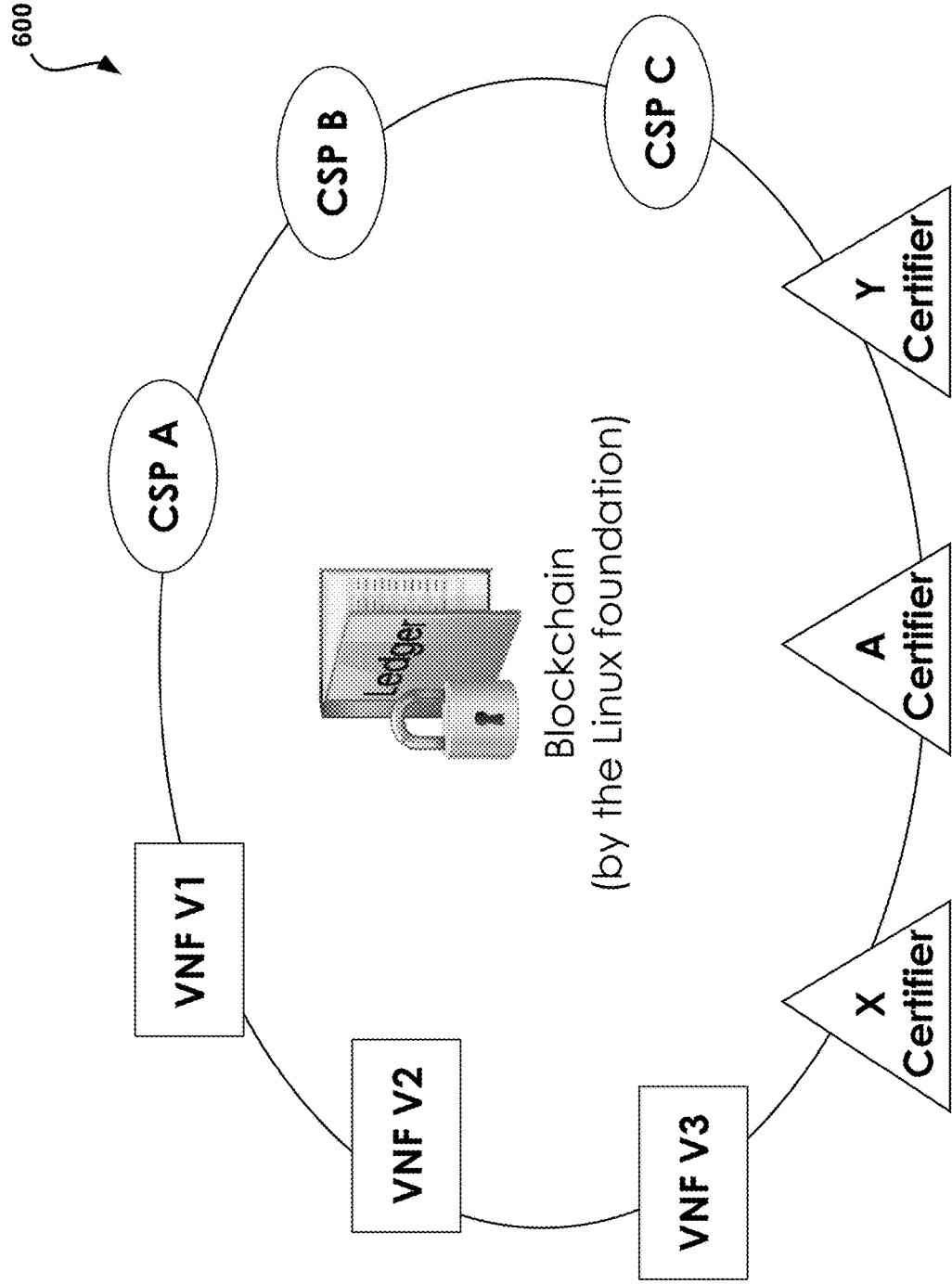
FIG. 6 illustrates a simplified diagram of a blockchain eco-system, in accordance with one embodiment.

FIG. 6 illustrates a simplified diagram 600 of a blockchain eco-system, in accordance with one embodiment. As an option, the diagram 600 may be viewed in the context of adding an overlay layer or additional point of view to the previous Figures. Of course, however, the diagram 600 may be viewed in the context of any desired environment. Further, the aforementioned definitions may equally apply to the description below.

The VNF eco-system is open to all players to join, including CSPs, VNF vendors, certifiers and other relevant participants.

A CSP refers to a company that provides communication services to consumers, based on a NFV compliant infrastructure. For that purpose, the CSPs are using VNFs for the various needed network services. The CSPs role in the eco-system is publishing requirements for VNFs and VNF certifications and contracting with other parties to incorporate VNFs within its infrastructure and services.

A VNF vendor refers to the provider of a specific VNF product.

A certifier refers to an entity providing certification services for VNFs to a certain certification data model (CDM) profile.

A CDM profile refers to a profile that defines the data model of a certain use case for a specific CSP, for example: CSP: Vodafone; Type: Performance; Product: VF ONAP; VNF: FW version xxx (optional). The CDM does not contain the actual certification requirement with which the VNF should comply.

A CDM compliance document is document describing the specific compliances that the CSP is requiring from a VNF in order to be eligible for underlying certification (CDM). The CDM compliance document is generally classified, and unless specified otherwise, will be shared only with the relevant certifiers and VNF vendors per a given contract. This document is a crucial element in the VNF certification process and each CDM must have a corresponding compliance document.

Any VNF vendor can offer VNFs (new products or new versions of existing products) in the eco-system. The VNF vendor's role in the eco-system is the offering of VNFs to the CSPs. In order to enable the CSP to trust a VNF, the VNF vendor should strive to gain the relevant certifications for a VNF.

The certifier role in the eco-system is to assist the VNF vendor and the CSP in achieving mutual trust. This will be done by certifying the VNF to the needed various certification profiles of the CSP.

Each VNF or new version of an existing VNF must be specifically certified for every type of certification (CDM). Each entity in the eco-system has its own reputation, which is an important part of the eco-system. The reputation of the VNFs is determined by the certifications they hold and by the CSP testimony compliances. The VNF Vendor reputation is determined by the VNFs they managed to certify and by the CSP testimonies.

The eco-system is not responsible for managing the reputation of each player, rather it holds and exposes all the relevant information to the various player, through open APIs. This will allow any third party application developer to offer added value services, such as VNF catalogue and discovery, reputation calculators (based on certifications, ranking, etc.), advanced deal success predictions (based on Machine Learning), and more.

Third party applications refer to applications developed by an entity that is not necessarily part of the eco-system, leveraging the eco-system open API to provide functionality that extends or enhance the eco-system services. The open eco-system includes a distributed publish-subscribe mechanism that enables any member of the eco-system to subscribe to any type of published events (e.g. bid publishing, contract signing, etc.).

An open API refers to a publicly available API that provides developers with programmatic access to the eco-system services.

Blockchain is the underline technology for the open bid and contract platform for VNFs. This technology enables various capabilities jointly, including: transparent and decentralized knowledge tracking and sharing of the eco-system transactions (bids, contracts, certifications, usage and documentation), such that no single party will have control over it; the technology will verify imposing truthfulness to all ledger transactions in a way that each interaction will be documented and published, and will remain unchanged, preventing fraud or any other manipulations; fairness and an unbiased eco-system in which every participant has the same status, which allows easy and simple introduction of new participants (VNF vendors, certifiers, and CSPs); and assuring the payment process and mechanism as part of the transactions, guarantying that each participant will receive a proper share for every transaction.

Figure 7:
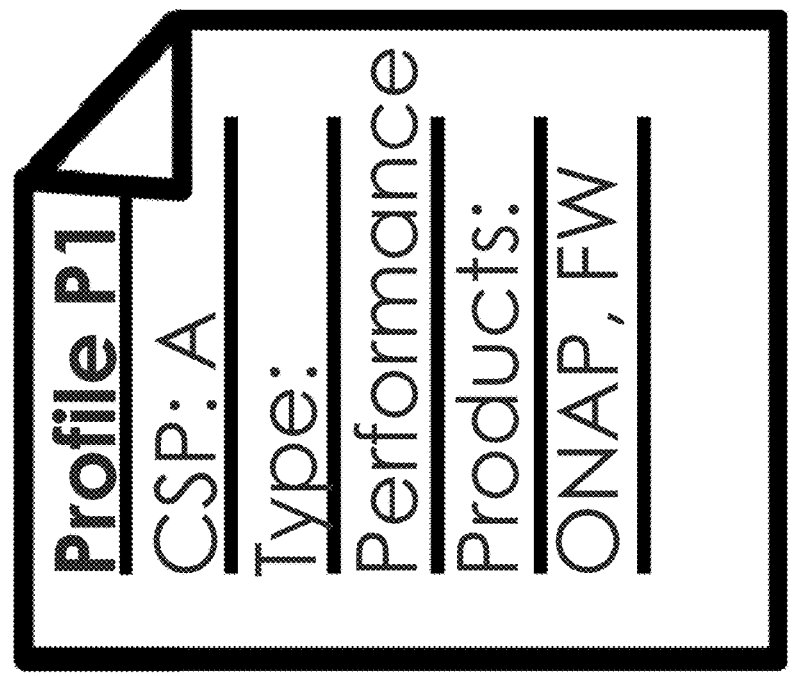
FIG. 7 illustrates a simplified diagram of certification profile, in accordance with one embodiment.

FIG. 7 illustrates a simplified diagram 700 of certification profile, in accordance with one embodiment. As an option, the diagram 700 may be viewed in the context of the details of the previous Figures. Of course, however, the diagram 700 may be viewed in the context of any desired environment. Further, the aforementioned definitions may equally apply to the description below.

The certifications are a means to simplify and standardize the VNFs adoption process for the CSPs. By certifying the VNF for a certain defined profile, the CSP will be able to minimize the time and effort needed to gain the necessary trust for integrating it within its infrastructure and networks.

The CDM (Certification Data Model) contains the properties of the certificate and indicates the type and characteristics of the certification process that the VNF has passed. In one embodiment, the CDM structure may be a document with properties including: profile name; CSP—indicating the CSPs to which the certificate applies; type—indicating the type of certification that was performed (e.g. compliance, performance, integration, etc.); product—indicating the CSPs' products or infrastructure to which the certification applies (the products can refer to a group or family of products and can be on the generic infrastructure/framework, such as ONAP); restrictions—indicating whether there any restrictions to the certification, such as maximum throughput for performance; and any additional relevant information needed.

The CDM can be based on a separate compliance document that specifies the details and characteristics of the certification requirements for the scope of the CDM.

The VNF eco-system platform may be used to facilitate bidding and contracts between the various players. The bidding process allows one player to publish a "bidding contract" that calls for other players to bid for a certain agreement (e.g. certification, etc.). The bidding player can decide to accept responses from the players, and sign the relevant contract with one or more of them. The terms of the contract are set between any two contract parties.

The bidding player can decide which of the players will receive the bid, whether it is by their certifications (that indicates their reputation and trust), or based on the bidder discretion. The players can decide what parts of the bidding and contract will be exposed to other players and what parts will remain confidential. Each contract holds the binding terms that determine the contract framework and validity. For example, if a VNF vendor signs a certification contract with a certifier, then it is limited only to the underline products and versions, as defined in the CDM.

In the context of the present description, a Certified for Certification (CFC) refers to an indication that a specific certifier has become a certification authority and has the right and ability for certifying VNFs to a specific profile (CDM). A bid for CFC refers to a request from a CSP to receive proposals from certifiers to sign a CFC contract. A CFC contract refers to an agreement between a CSP and a certifier that allows the certifier to certify VNFs based on the CFC profile (CDM).

A CFP (Certified for Profile) refers to an indication that a specific VNF (product+version) is certified for a specific profile (CDM). A bid for CFP refers to a request from a VNF vendor to receive proposals from certifiers to sign a CFP contract. A CFP contract refers to an agreement between a VNF vendor and a certifier in which the certifier grants a specific VNF certification for a specific CDM.

Figure 8:
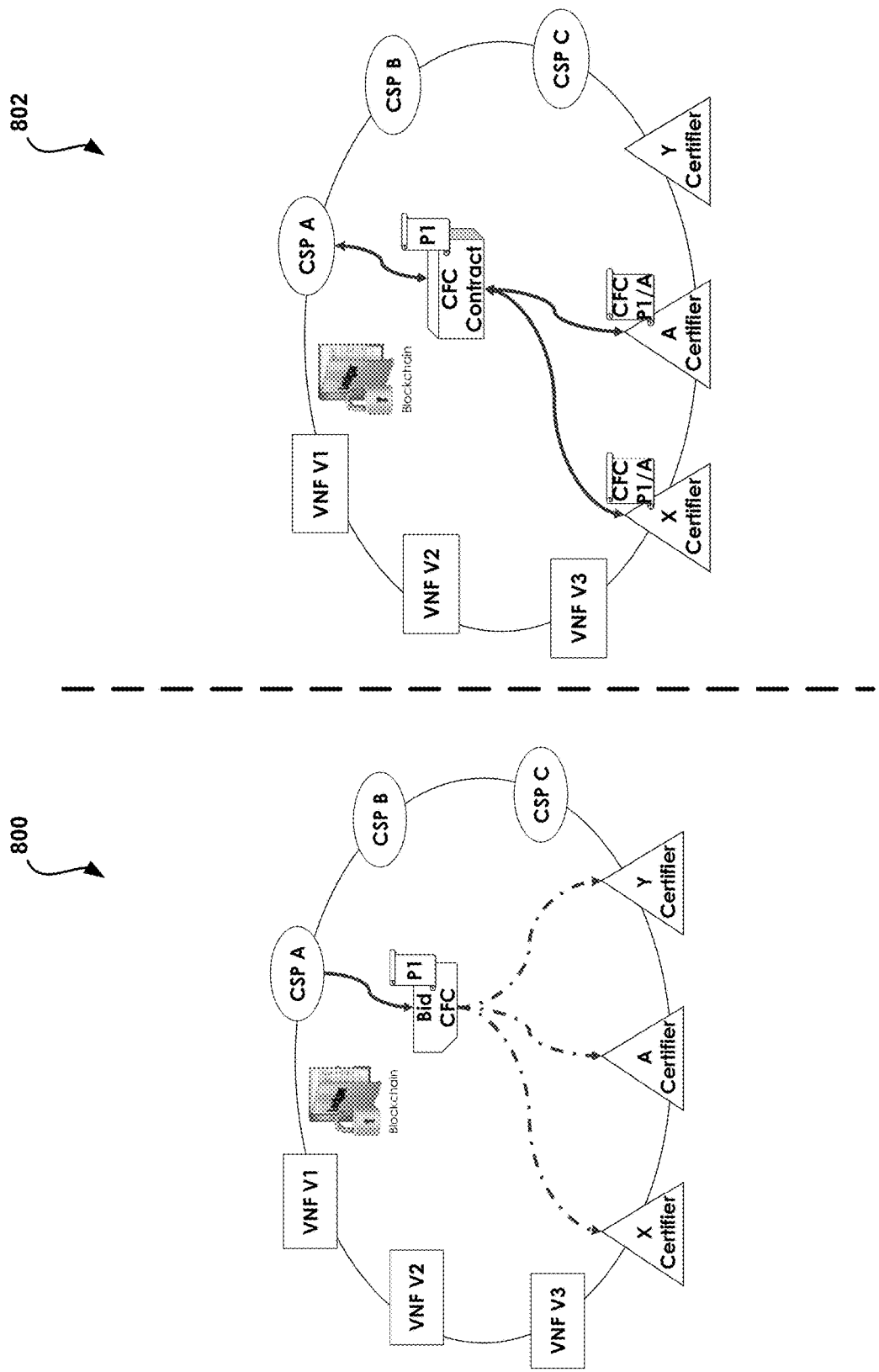
FIG. 8 illustrates simplified diagrams of use cases, emphasizing the Certified for Certification (CFC) processes, in accordance with one embodiment.

FIG. 8 illustrates simplified diagrams 800 and 802 of use cases, in accordance with one embodiment. As an option, the diagrams 800 and 802 may be viewed in the context of the details of the previous Figures. Of course, however, the diagrams 800 and 802 may be viewed in the context of any desired environment. Further, the aforementioned definitions may equally apply to the description below.

The diagrams 800 and 802 describe a possible use-case for a CFC bid and contract process. In this case (diagram 800—CFC bidding process), CSP A requests for proposals from certifiers to become certified for CDM profile P1. The bid is accepted by three potential certifiers (X, Y and A).

In this phase (diagram 802—CFC contracting process), CSP A decides to accept the offer from certifiers X and A, and sign a CFC contract with them.

Utilizing this system and architecture any CSP can create a call for certifiers for any collection of VNFs (this can be defined in a CDM that will define a requirements types—e.g. P1/A). Also, certifications can be applied to a Service Chain (bundle) of VNFs that provide service functionalities (e.g. DDOS, VPN, vCPE, etc.).

Any such offering will be logged in the blockchain network (ledger log entry), regardless of its result (success or failure).

Further, any party with certification abilities can request the bid compliance documents. Any party that receives the bid documents can respond to the bid.

Upon signing a contract between the CSP and the certifier, the certifier becomes a certification authority to this CSP for the scope of the underlining CDM. All CFC contracts between the CSPs and the certifiers will be public data, including the identity of the CSP and the certifier, as well as the certification profile (CDM). The compliance document that specifies the details of the certification process will normally be confidential.

Figure 9:
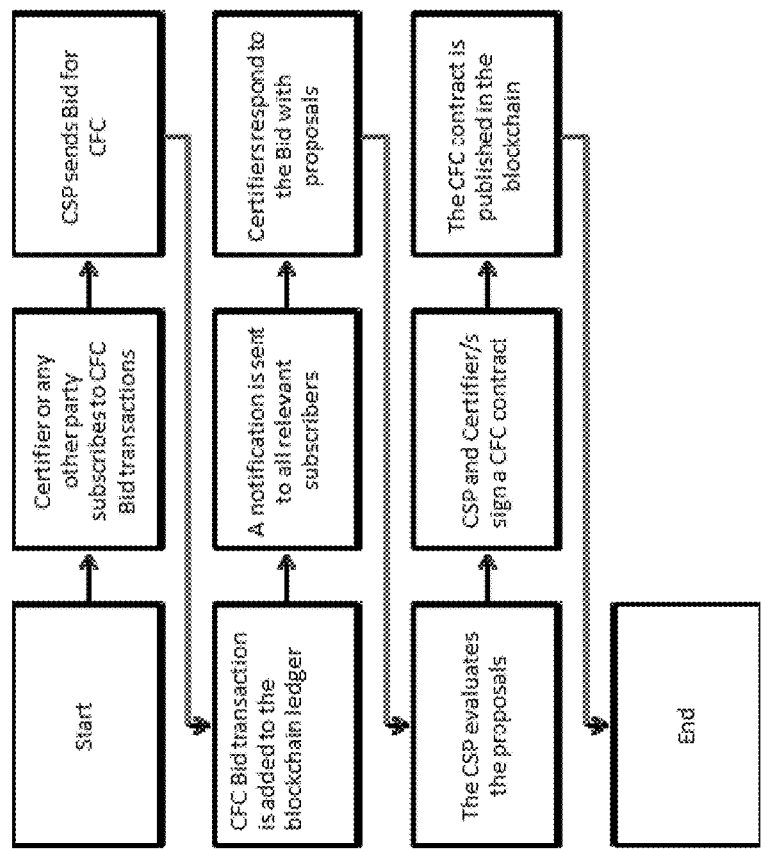
FIG. 9 illustrates a simplified diagram showing a generalized process described in the context of FIG. 8, in accordance with one embodiment.

FIG. 9 illustrates a simplified diagram 900 showing a generalized process described in the context of FIG. 8, in accordance with one embodiment. As an option, the diagram 900 may be viewed in the context of the details of the previous Figures. Of course, however, the diagram 900 may be viewed in the context of any desired environment. Further, the aforementioned definitions may equally apply to the description below.

As shown, a certifier or any other party subscribes to CFC bid transactions. A CSP sends a bid for a CFC. A CFC bid transaction is added to the blockchain ledger. A notification is sent to all relevant subscribers. Certifiers respond to the bid with proposals. The CSP evaluates the proposals. The CSP and certifiers sign a CFC contract. Additionally, the CFC contract is published in the blockchain.

Figure 10:
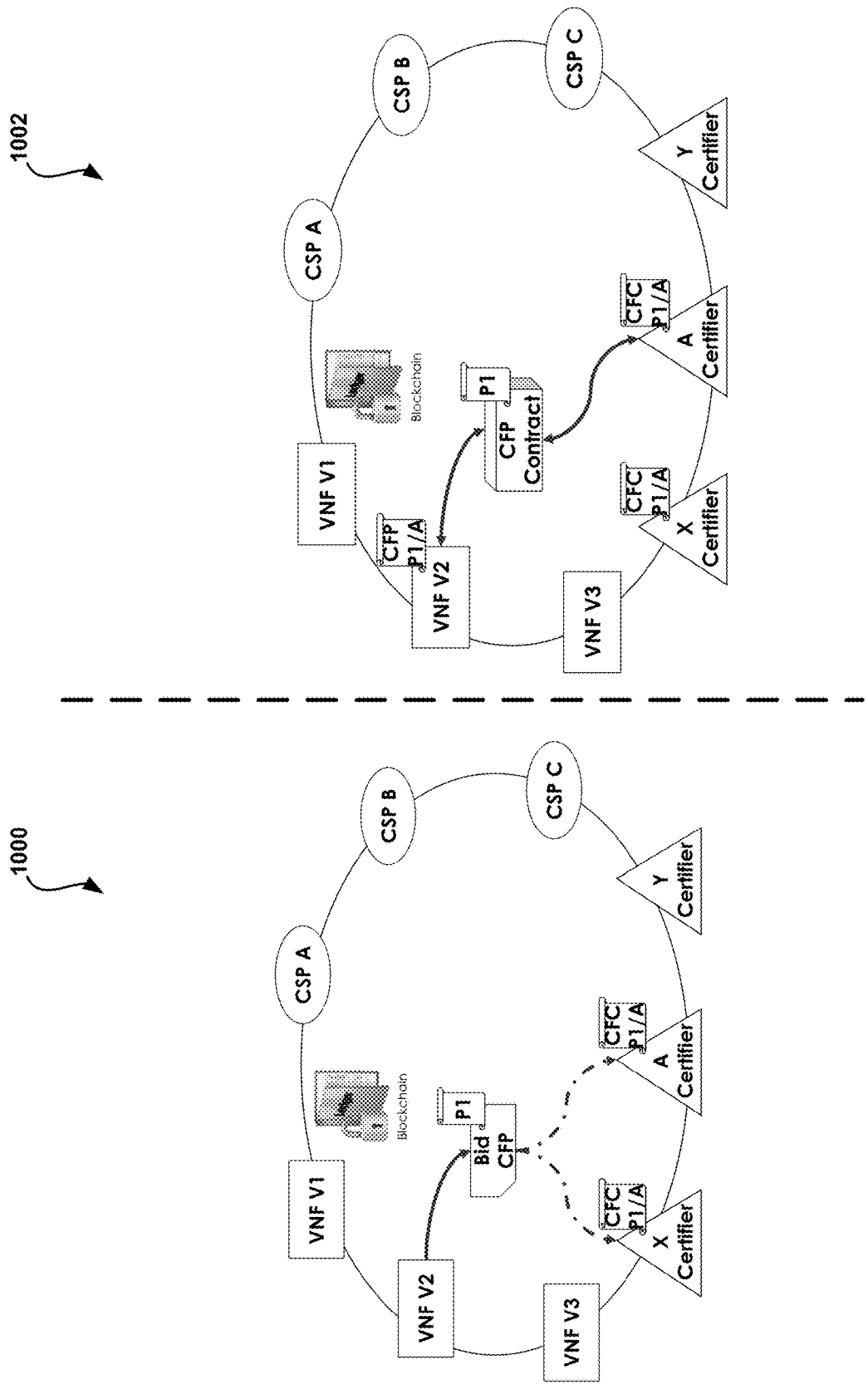
FIG. 10 illustrates simplified diagrams of use cases, emphasizing the Certified for Profile (CFP) processes, in accordance with one embodiment.

FIG. 10 illustrates simplified diagrams 1000 and 1002 of use cases, in accordance with one embodiment. As an option, the diagrams 1000 and 1002 may be viewed in the context of the details of the previous Figures. Of course, however, the diagrams 1000 and 1002 may be viewed in the context of any desired environment. Further, the aforementioned definitions may equally apply to the description below.

The diagrams 1000 and 1002 describe a possible use-case for a CFP (Certified for Profile) bid and contract process. Any VNF vendor can publish in the blockchain eco-system a request for certification for a specific CDM. The VNF vendor can decide what bid information will be public and what will remain confidential. The VNF vendor can sign a certification contract with one or more of the certifiers, where each contract can refer to one or more of the CDM types.

A bid can be won per each certification type separately. For example, VNF V2, which is a router and load balancer, may bid for certification for throughput, latency, security and malware-free for CSP A. In this case, certifier A won a contract to certify for throughput and latency and certifier X won a contract for security and malware-free. The certification contract will be publicly published in the blockchain (identities and CDM only).

Within the terms of the contract, the certifier will execute the certification process for the VNF. Following the certification of the VNF, a CFP (Certified for Profile) transaction will be publicly published in the blockchain stating that the VNF is certified for the specific profile.

The CFP transaction will include the CDM profile and the VNF details (e.g. vendor, VNF name, specific version code, etc.) and it will be cryptographically signed by the certifier private key. The CFP transaction will not include the actual binary signature of the certified VNF, which will remain in the certifier possession. Anyone who wishes to validate the certification of a given VNF binary code (e.g. a CSP) will be required to do so with the certifier.

Figure 11:
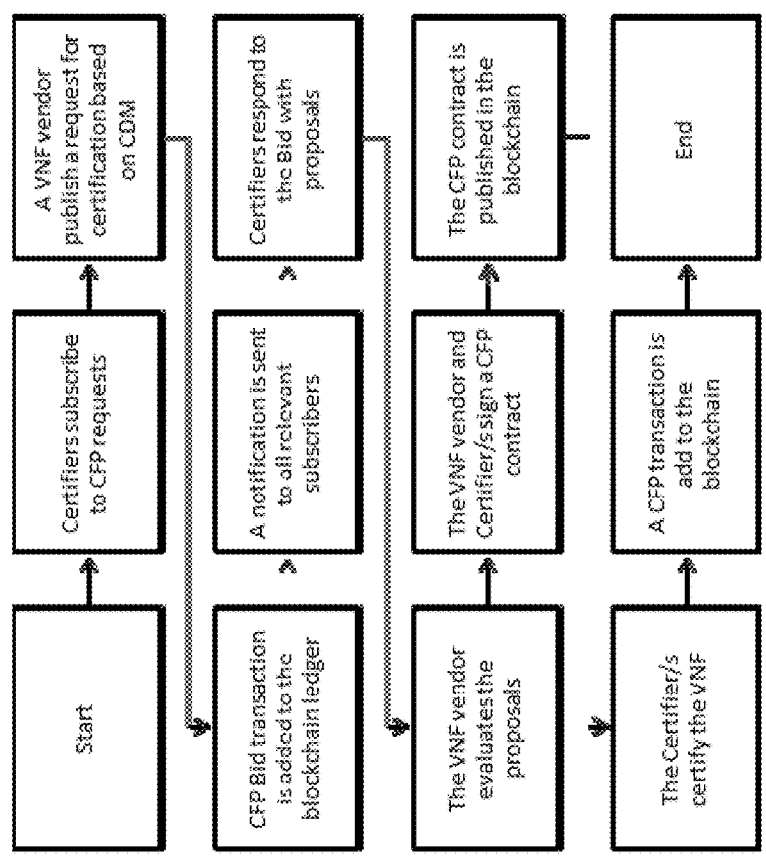
FIG. 11 illustrates a simplified diagram showing a generalized process described in the context of FIG. 10, in accordance with one embodiment.

FIG. 11 illustrates a simplified diagram 1100 showing a generalized process described in the context of FIG. 10, in accordance with one embodiment. As an option, the diagram 1100 may be viewed in the context of the details of the previous Figures. Of course, however, the diagram 1100 may be viewed in the context of any desired environment. Further, the aforementioned definitions may equally apply to the description below.

As shown, certifiers subscribe to CFP requests. A VNF vendor publishes a request for certification based on the CDM. A CFP bid transaction is added to the blockchain ledger. A notification is sent to all relevant subscribers. Certifiers respond to the bid with proposals. The VNF vendor evaluates the proposals. Further, the VNF vendor and certifiers sign a CFP contract. The CFP contract is published in the blockchain. The certifiers certify the VNF. A CFP transaction is added to the blockchain.

Figure 12:
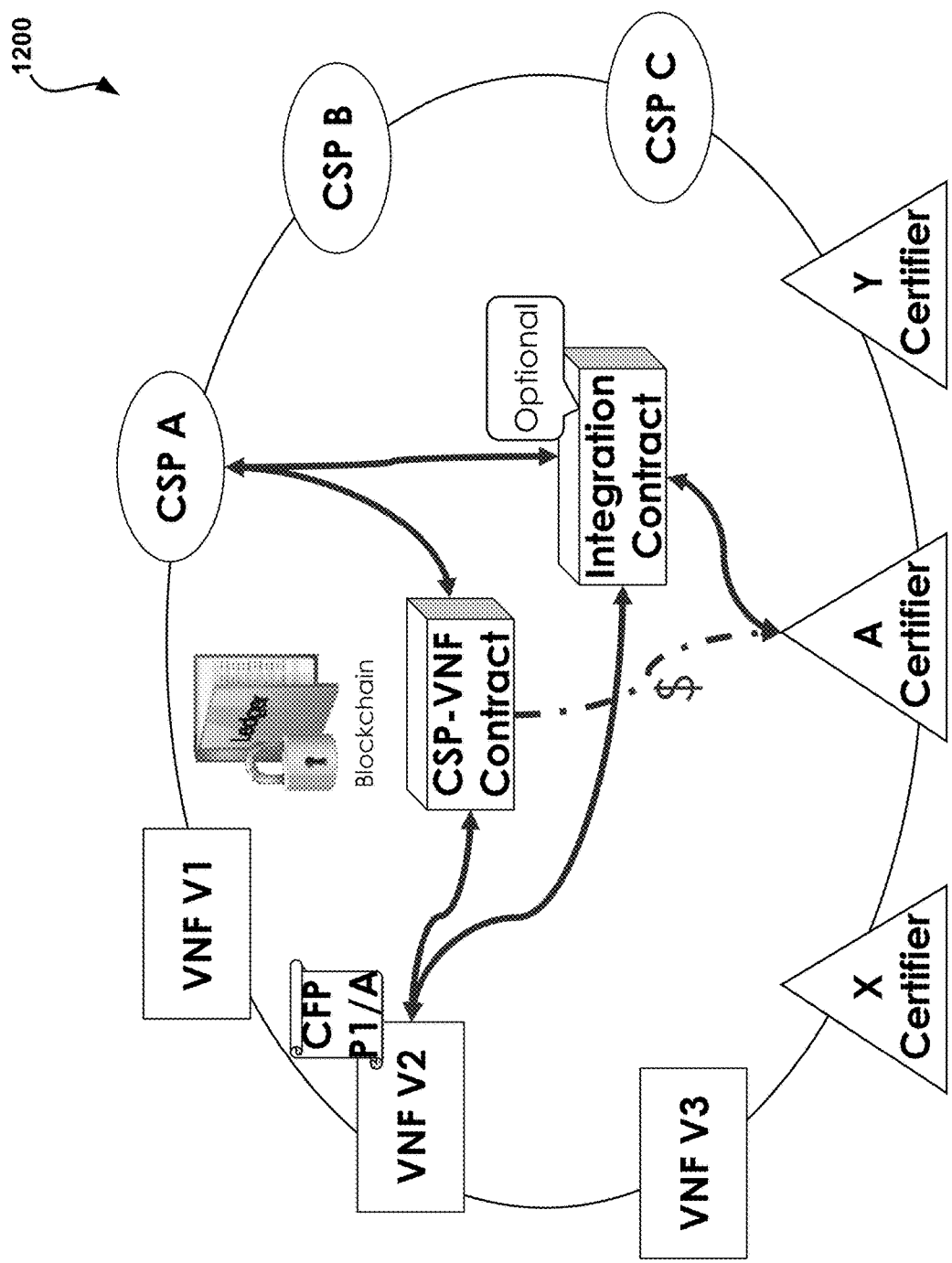
FIG. 12 illustrates a simplified diagram showing a use case, emphasizing the VNF consumption and integration contract processes, in accordance with one embodiment.

FIG. 12 illustrates a simplified diagram 1200 showing a use case, in accordance with one embodiment. As an option, the diagram 1200 may be viewed in the context of the details of the previous Figures. Of course, however, the diagram 1200 may be viewed in the context of any desired environment. Further, the aforementioned definitions may equally apply to the description below.

In operation, a CSP can publish a bid for a VNF with certain certifications (CFP). Only vendors with VNFs that hold the relevant certifications can respond and accept the bid. In the response, they can authorize the CSP to get access to the details of their certifications, as published in the blockchain. Only the certifier, who holds the binary signature of the original VNF, can verify that the offered VNF is the same code and version as the one that was actually certified.

This may be achieved because the contract will be published in the blockchain. The contracting parties will decide which part of the information will be public. As part of the contract between the VNF vendor and its certifiers, the VNF vendor might be required to pay a certification fee to its certifiers. This applies only to successfully completed certifications that are published in the blockchain. The CSP and its certifiers might have additional finance agreements that can require either one of them to pay the other an agreed upon fee. The CSP will select one or more of the responding VNF vendors and sign a contract with them.

Figure 13:
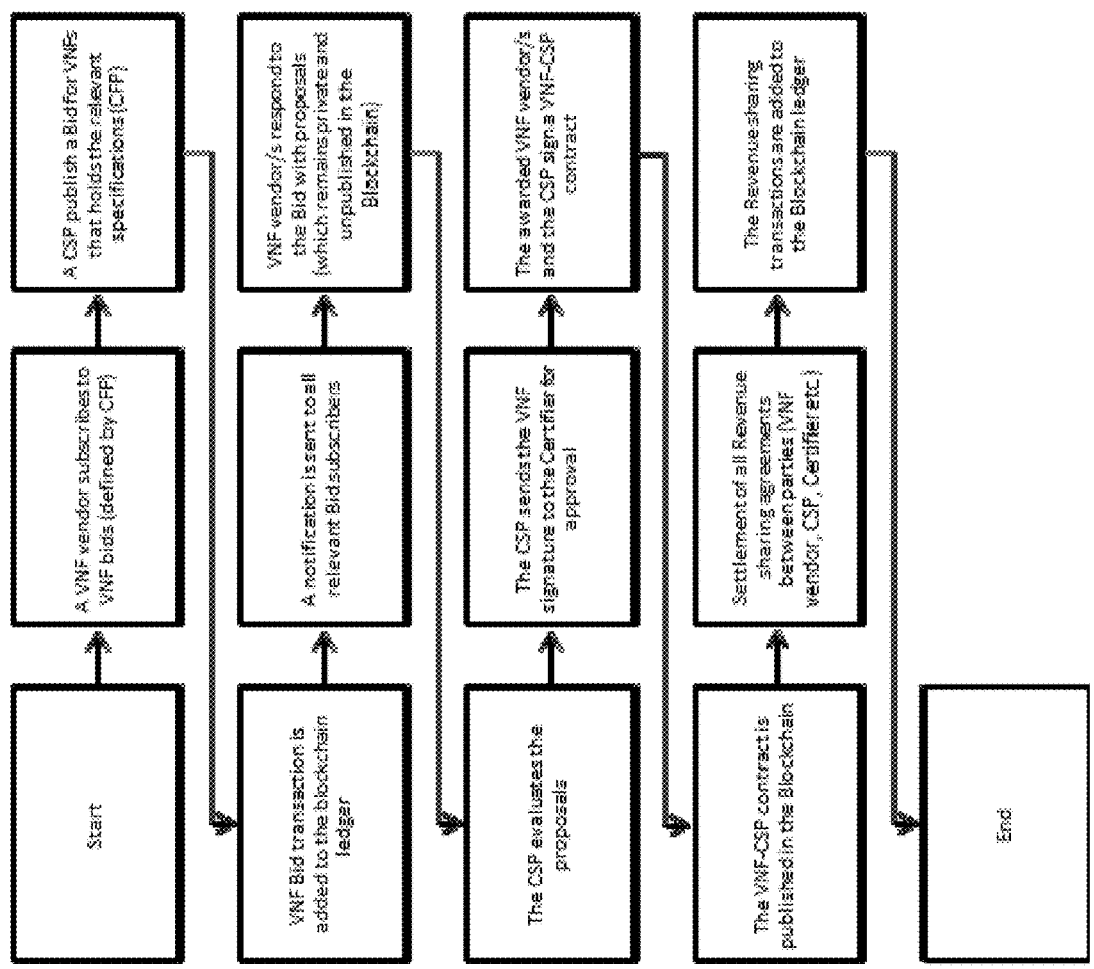
FIG. 13 illustrates a simplified diagram showing a generalized process described in the context of FIG. 12, in accordance with one embodiment.

FIG. 13 illustrates a simplified diagram 1300 showing a generalized process described in the context of FIG. 12, in accordance with one embodiment. As an option, the diagram 1300 may be viewed in the context of the details of the previous Figures. Of course, however, the diagram 1300 may be viewed in the context of any desired environment. Further, the aforementioned definitions may equally apply to the description below.

As shown, a VNF vendor subscribes to VNF bids (defined by CFP). A CSP published a bid for VNFs that holds the relevant certifications (CFP). A VNF bid transaction is added to the blockchain ledger. A notification is sent to all relevant bid subscribers. VNF vendors respond to the bid with proposals (which remains private and unpublished in the blockchain). Further, the CSP evaluates the proposals. The CSP sends the VNF signature to the certifier for approval. The awarded VNF vendors and the CSP sign a VNF-CSP contract. The VNF-CSP contract is published in the blockchain. Additionally, there is a settlement of all revenue sharing agreements between parties (VNF vendor, CSP, certifier, etc.). The revenue sharing transactions are added to the blockchain ledger.

Following a CSP-VNF vendor contract, a certifier that certified that VNF can offer the parties its services to integrate the VNF within the CSP environment. These services can include installation, setup and configuration, and/or maintenance, etc. These services are not part of the blockchain eco-system and may not be published in it.

For a CFC contract, the following information may be exposed, unless specifically required otherwise by the contract parties: CSP identity; Certifier identity; and CDM profile (including the certification type, such as performance, malware protection, etc.).

The CDM compliance documents will normally remain confidential, unless decided otherwise. The terms of the contract (e.g. financial arrangements) will normally remain confidential, unless decided otherwise. Transactions that affect reputation may include certifications, approval and usage contracts, activities (e.g. deployment of new versions), and feedback from any player.

The VNF eco-system with the certification mechanisms described herein, based on an unbiased and transparent blockchain technology, enables VNF vendors to gain the necessary trust and assures the CSPs that all transactions are real and trustful.

The eco-system and the VNF marketplace will increase the exposure of many VNF vendors to the CSPs, expediting the introduction of new products and capabilities. The CSP can rely on the blockchain publications and VNF certifications to reduce the breadth and complexity of testing during the integration process and acceptance tests. This will shorten the duration of the full VNF integration process, as well as significantly reduce the overall cost.

Leveraging the certifier's expertise and its intimate knowledge with the VNF to provide Integration Services has a promising potential to bring additional savings and increase the CSP's value.

The open VNF eco-system will encourage many more VNF vendors to develop and offer VNFs, increasing the variety and competition in the market. The eco-system will also simplify and shorten the process required to introduce, certify, and integrate the VNF with the CSPs. This will drive a significant decrease in the VNF prices.

Using the blockchain eco-system with the bid and contract mechanisms will enable simpler interactions between all participants (VNF vendors, certifiers, and CSPs). This will allow a smoother process with much lower levels of bureaucracy.

Implementing the eco-system and encouraging many new VNF vendors to participate will bring new opportunities, ideas, and innovation to the market.

The eco-system will serve as a catalyst for the VNF vendor to develop capabilities for the CSP needs and for the CSPs to publish requests for information and innovation to be answered by the various eco-system participants.

FIGS. 14A-14F illustrate blockchain contract examples, in accordance with various embodiments. As an option, the examples may be viewed in the context of the details of the previous Figures. Of course, however, the examples may be viewed in the context of any desired environment. Further, the aforementioned definitions may equally apply to the description below.

In the examples, all blockchain contracts are in JSON format. The examples show the most necessary data for each contract. Additional information may be added as optional parameters or due to implementation requirements. All values, except for "contract_type", are only for example.

FIG. 14A shows a Register Participant. The contract may include additional information of the participant (such as address, website, description, contact persons, etc.). The contract is only signed by the registered participants, without a need for approval by a central authority, in order to keep the eco-system truly open.

FIG. 14B shows a Bid for CFC. FIG. 14C shows a CFC Contract.

FIG. 14D shows a Bid for CFP. FIG. 14E shows a CFP Contract. The contract does not contain a signed signature of the VNF binary code. It will be kept by the Certifier and any participant that wants to validate the authenticity of the VNF binary code will need to contact the Certifier through an API call (should be implemented by the Certifier) or any other method, that may require financial arrangement.

FIG. 14F shows a CSP-VNF Contract.

In order to remove any doubt, FIGS. 14A-14F are only examples to be used for descriptive purposes.

Figure 15:
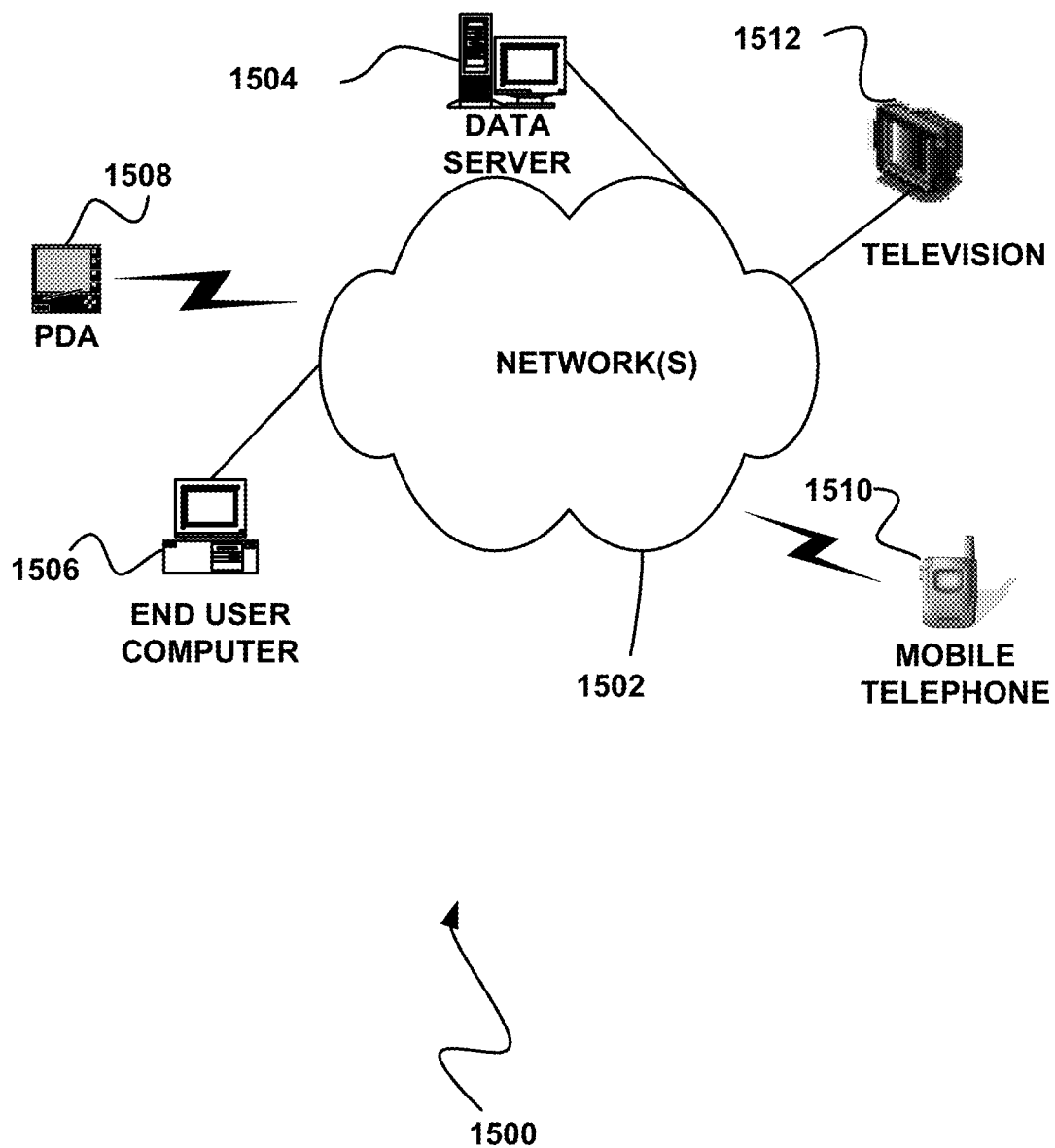
FIG. 15 illustrates a network architecture, in accordance with one possible embodiment.

FIG. 15 illustrates a network architecture 1500, in accordance with one possible embodiment. As shown, at least one network 1502 is provided. In the context of the present network architecture 1500, the network 1502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1502 may be provided.

Coupled to the network 1502 is a plurality of devices. For example, a server computer 1504 and an end user computer 1506 may be coupled to the network 1502 for communication purposes. Such end user computer 1506 may include a desktop computer, lap-top computer, and/or any other type of logic. Still yet, various other devices may be coupled to the network 1502 including a personal digital assistant (PDA) device 1508, a mobile phone device 1510, a television 1512, etc.

Figure 16:
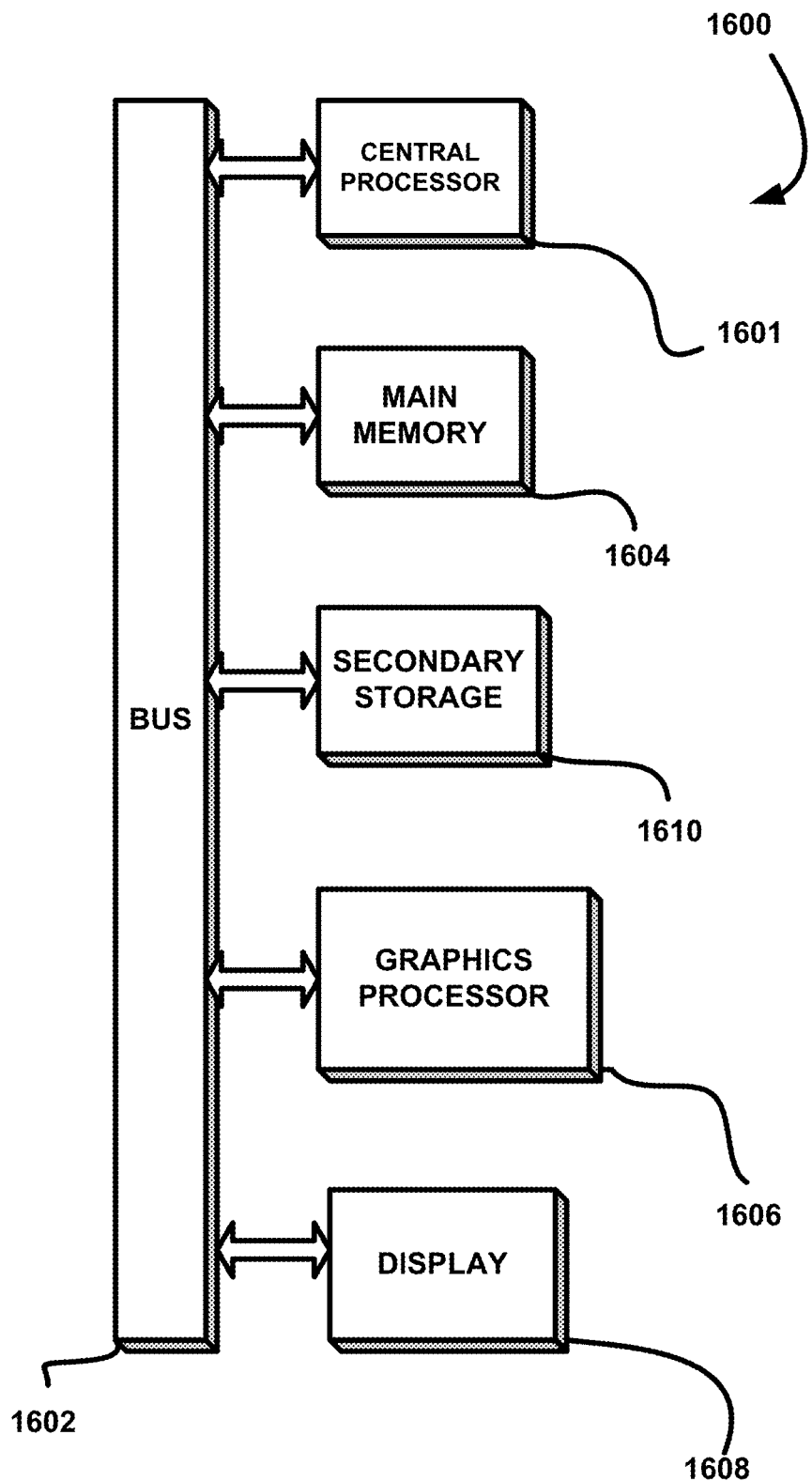
FIG. 16 illustrates an exemplary system, in accordance with one embodiment.

FIG. 16 illustrates an exemplary system 1600, in accordance with one embodiment. As an option, the system 1600 may be implemented in the context of any of the devices of the network architecture 1500 of FIG. 15. Of course, the system 1600 may be implemented in any desired environment.

As shown, a system 1600 is provided including at least one central processor 1601 which is connected to a communication bus 1602. The system 1600 also includes main memory 1604 [e.g. random access memory (RAM), etc.]. The system 1600 also includes a graphics processor 1606 and a display 1608.

The system 1600 may also include a secondary storage 1610. The secondary storage 1610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1604, the secondary storage 1610, and/or any other memory, for that matter. Such computer programs, when executed, enable the system 1600 to perform various functions (as set forth above, for example). Memory 1604, storage 1610 and/or any other storage are possible examples of tangible computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a system, a first request by a virtual network function (NVF) vendor to publish first information to an open, global or private blockchain system, the first information including a request for certification according to a certification profile of a VNF provided by the VNF vendor;
   responsive to the first request, publishing, by the system, the first information to the blockchain system such that the information is stored to a ledger utilizing blockchain technology; and
   sending, by the system, at least one notification to one or more certifiers indicating that the first information has been published to the blockchain system for accessing by the one or more certifiers;
   receiving, by the system, a second request by the VNF vendor or one of the one or more certifiers to publish to the blockchain system second information associated with a contract, the contract being for the certification according to the certification profile of the VNF provided by the VNF vendor;
   responsive to the second request, publishing, by the system, the second information associated with the contract to the blockchain system;
   following the certification of the VNF by the one of the one or more certifiers according to the contract, receiving, by the system, a third request by the one of the one or more certifiers to publish to the blockchain system third information stating that the VNF is certified according to the certification profile; and
   responsive to the third request, publishing, by the system, the third information to the blockchain system for accessing by one or more entities.

2. The method of claim 1, wherein the blockchain system includes a distributed publish-subscribe mechanism that enables any member of the blockchain system to subscribe to any type of published events.

3. A computer program product embodied on a non-transitory computer readable medium, comprising computer code for:
   receiving, by a system, a first request by a virtual network function (NVF) vendor to publish first information to an open, global or private blockchain system, the first information including a request for certification according to a certification profile of a VNF provided by the VNF vendor;
   responsive to the first request, publishing, by the system, the first information to the blockchain system such that the information is stored to a ledger utilizing blockchain technology; and
   sending, by the system, at least one notification to one or more certifiers indicating that the first information has been published to the blockchain system for accessing by the one or more certifiers;
   receiving, by the system, a second request by the VNF vendor or one of the one or more certifiers to publish to the blockchain system second information associated with a contract, the contract being for the certification according to the certification profile of the VNF provided by the VNF vendor;
   responsive to the second request, publishing, by the system, the second information associated with the contract to the blockchain system;
   following the certification of the VNF by the one of the one or more certifiers according to the contract, receiving, by the system, a third request by the one of the one or more certifiers to publish to the blockchain system third information stating that the VNF is certified according to the certification profile; and
   responsive to the third request, publishing, by the system, the third information to the blockchain system for accessing by one or more entities.

4. The computer program product of claim 3, wherein the blockchain system includes a distributed publish-subscribe mechanism that enables any member of the blockchain system to subscribe to any type of published events.

5. A system, comprising one or more processors, operable for:
   receiving, by the system, a first request by a virtual network function (NVF) vendor to publish first information to an open, global or private blockchain system, the first information including a request for certification according to a certification profile of a VNF provided by the VNF vendor;
   responsive to the first request, publishing, by the system, the first information to the blockchain system such that the information is stored to a ledger utilizing blockchain technology; and
   sending, by the system, at least one notification to one or more certifiers indicating that the first information has been published to the blockchain system for accessing by the one or more certifiers;
   receiving, by the system, a second request by the VNF vendor or one of the one or more certifiers to publish to the blockchain system second information associated with a contract, the contract being for the certification according to the certification profile of the VNF provided by the VNF vendor;
   responsive to the second request, publishing, by the system, the second information associated with the contract to the blockchain system;
   following the certification of the VNF by the one of the one or more certifiers according to the contract, receiving, by the system, a third request by the one of the one or more certifiers to publish to the blockchain system third information stating that the VNF is certified according to the certification profile; and responsive to the third request, publishing, by the system, the third information to the blockchain system for accessing by one or more entities.

6. The method of claim 1, wherein the blockchain is further utilized for VNF consumption processes.

7. The method of claim 1, wherein the VNF is used by a communication service provider (CSP) to provide network services.

* * * * *